United States Patent
Dobry

(10) Patent No.: US 7,301,532 B1
(45) Date of Patent: Nov. 27, 2007

(54) DIGITAL DISPLAY KEYBOARD

(76) Inventor: Jerod M Dobry, 2144 E. Horseshoe Dr., Pottstown, PA (US) 19464

( * ) Notice: Subject to any disclaimer, the term of this patent is extended or adjusted under 35 U.S.C. 154(b) by 659 days.

(21) Appl. No.: 10/774,864

(22) Filed: Feb. 9, 2004

(51) Int. Cl.
G09G 5/00 (2006.01)

(52) U.S. Cl. ............ 345/172; 345/156; 345/168; 345/170; 345/171

(58) Field of Classification Search ......... 345/172, 345/168, 170, 156, 171
See application file for complete search history.

(56) References Cited

U.S. PATENT DOCUMENTS

| | | | |
|---|---|---|---|
| 3,956,745 A | 5/1976 | Ellis | |
| 4,200,913 A | 4/1980 | Kuhar et al. | |
| 4,280,121 A | 7/1981 | Crask | |
| 4,633,227 A | 12/1986 | Menn | |
| 4,853,888 A | 8/1989 | Lata et al. | |
| 4,885,580 A | 12/1989 | Noto et al. | |
| 4,897,651 A * | 1/1990 | DeMonte | ............ 341/23 |
| 5,128,672 A | 7/1992 | Kaehler | |
| 5,387,042 A | 2/1995 | Brown | |
| 5,515,045 A | 5/1996 | Tak | |
| 6,199,125 B1 | 3/2001 | Cortesi | |
| 6,961,048 B2 * | 11/2005 | Mitchell | ............ 345/168 |

FOREIGN PATENT DOCUMENTS

GB 2.313.343 11/1997

* cited by examiner

Primary Examiner—Richard Hjerpe
Assistant Examiner—Leonid Shapiro
(74) Attorney, Agent, or Firm—Michael I Kroll

(57) ABSTRACT

A digital keyboard has a plurality of keys having a top key surface having means for displaying images and indicia thereon. While the images/indicia can be composed of any picture, illustration, words or combination thereof, the preferred embodiment of the present invention is to display predetermined images and/or words on key caps representing shortcut key sequences for performing functions related to a user's current in process computer software applications as opposed to using a mouse to perform those same function through activation and selection from drop down menus or icons. Alternatively, a digital display screen forming an integral part of a keyboard whereupon information related to software applications can be displayed.

4 Claims, 14 Drawing Sheets

DIGITAL DISPLAY KEYBOARD

BACKGROUND OF THE INVENTION

1. Field of the Invention

The present invention relates to computer keyboards, and more specifically, to a digital keyboard with a plurality of keys having a top key surface having means for displaying images and indicia thereon. While the images/indicia can be composed of any picture, illustration, words or combination thereof, the preferred embodiment of the present invention is to display predetermined images and/or words on key caps representing shortcut key sequences for performing functions related to a user's current in process computer software applications as opposed to using a mouse to perform those same function through activation and selection from drop down menus or icons. Alternatively, a digital display screen forming an integral part of a keyboard whereupon information related to software applications can be displayed.

2. Description of the Prior Art

With the computer literacy of the population increasing, more tasks are being performed electronically requiring a working knowledge of several applications. Software vendors vying for market share are continuously releasing new versions of their software with the enhancement of added features that has resulted in behemoth application no longer relegated to a single process but melding Internet, Illustration, Word Processing, CAD, etc, into cross processing software suites. Making it a monumental challenge to remember what key sequences execute what function, since these key sequences are at the discretion of the software designer. Many older software applications exclusively used keyboard sequences as shortcut commands before the popularization of the mouse and have maintained backward compatibility as newer versions of the software are designed.

Use of shortcut key sequences, therefore is outside the purview of many users due largely to their application specific nature rather than a user complacent satisfaction of manipulating the mouse pointing device.

There have been many efforts to enhance the functionality of the keyboard that has primarily entailed the addition of keys. As evidenced by the evolution from the 83 key XT version to the 84 key AT version, followed by the 101, 102, and lately 104 key Windows version that are the de-facto standards for keyboards. Still, the keyboard remains a static input device. It should be noted, that there are programmable keyboard whereby proficient computer users can define their own key layout and macro key sequences, but these are still static devices that do not change in accordance with the current application.

Numerous other keyboards exist in the prior art. Typical of these are U.S. Pat. Nos. 4,200,913; 4,280,121; 4,633,227; 4,853,888; 4,885,580; 5,128,672; 5,387,042; 5,515,045; 6,199,125 B1; and U.K. Patent Number 2,313,343. While these keyboards may be suitable for the purposes for which they were designed, they would not be as suitable for the purposes of the present invention, as hereinafter described.

U.S. Pat. No. 3,956,745

Inventor: Alfred Brian Edwin Ellis

Issued: May 11, 1976

A programmable keyboard of the kind in which a member presents a plurality of discrete areas to a co-operating probe, each of which areas produces a unique signal when addressed by the probe, is provided with a liquid crystal display to identify the current function of a particular area. Separate additional addressable areas are provided by means of which one of a number of alternative display functions can be selected as desired.

U.S. Pat. No. 4,200,913

Inventor: Eugene Kuhar et al.

Issued: Apr. 29, 1980

A cathode ray tube (CRT) and keyboard display terminal are operated in accordance with the program routines of a microcontroller. The microcontroller includes a random access store which is loadable by the customer during initial program load (IPL) operation to store customer selected program routines for controlling the CRT display and keyboard and for initializing tables in the store which define the customer selected character and symbol set. The tables provide data for determining the functions which are to be performed incident to the depression of each key and since these are customer loadable, the functions can be changed by reinitializing the system. These tables provide the mechanism whereby an operator making use of the keyboard can manually change the functions of each and every key on the keyboard except one key which is dedicated to the function of redefining the functions of other keys. This mechanism permits the operator to manually chain together a large number of functions which will be executed in sequence incident to the depression of a single key which has been selected and redefined to perform all of the desired functions. A redefined key may be returned to its original function by the operator by means of manipulation of the redefine mode key and the key which has been redefined.

U.S. Pat. No. 4,280,121

Inventor: Geoffrey Crask

Issued: Jul. 21, 1981

A keyboard/display assembly is provided in which the individual key legends are controlled by an external computer. The computer is programmed to respond to any specific key activation in a manner defined by the current displayed legend for that key. These responses may include changing the legend on the initiating key, or those on any other keys. By this means, a small number of keys may replace an arbitrarily large number of fixed function keys.

U.S. Pat. No. 4,633,227

Inventor: Walter Menn

Issued: Dec. 30, 1986

There is disclosed a programmable keyboard apparatus for allowing a user to select any one of a predetermined number of different keyboard arrangements such as the Qwerty or the Dvorak arrangements. The keyboard contains a plurality of fixed input keys arranged in rows and columns and according to a standard typewriter keyboard format. Each key has positioned above the key an indicating area whereby the designation or symbol for the key is automatically changed by the apparatus each time a different format is selected. In this manner, the user can experiment with keyboard formats which enable more rapid typing with fewer errors. The construction is extremely economical, and therefore, in utilizing the apparatus a user will have access to different keyboard arrangements which will increase the users ability to type or enter data. The keyboard disclosed can be used as a computer keyboard which will also enable a rapid change of symbols while permitting the operator to view the symbols for each different format through the respective windows.

U.S. Pat. No. 4,853,888

Inventor: Walter J. Lata et al.

Issued: Aug. 1, 1989

A programmable, multifunction keyboard system in which the key configurations and the relationships between key configurations are fully specified by a data base. The keyboard system comprises a keyboard (16) having a plurality of keys (18), each key comprising a switch (68) and display means (66) for displaying a legend visually associated with the switch, and actuation control means (46) for monitoring the switches and providing an actuation signal identifying an actuated switch. The system further comprises a processor (12) that includes means for storing a data base (80). The data base comprises a plurality of control pages (82), each control page (90) including legend data (96) and next page data (98). The legend data specifies a legend for display in association with at least one of the switches, and the next page data specifies a next control page associated with at least one of the switches. The processor further comprises means for designating one of the control pages as the active control page, and means responsive to the actuation of a selected switch to redesignate the active control page based upon the next page data corresponding to the selected switch. The actuation means may comprise means for detecting a switch that may be inoperative, and the processor may include reconfiguration means for reconfiguring each active control page such that legend data and next page data is not associated with an inoperative switch.

U.S. Pat. No. 4,885,580

Inventor: Hiroshi Noto et al.

Issued: Dec. 5, 1989

A multi-function key input device having a touch panel serving as a key input means, which is operated separately according to different operational modes to display different symbols or matters with the aid of a central processing section, a memory section, a digital shift register and LCD drivers operating a liquid crystal device.

U.S. Pat. No. 5,128,672

Inventor: Edwin B. Kaehler

Issued: Jul. 7, 1992

A keyboard having the ability to predictively display different characters in association with its various keys within a variety of predefined character set layouts, based upon either the character preceding an insertion point in a corresponding text field on a display or the last character entered from the keyboard is disclosed. Although each key of the keyboard is capable of displaying numerous different characters, each key represents only one character at a time and each character is displayed at only one key location. The user can also manually change character set layouts. When a user selects a particular key or selects an insertion point within the text field, all keys are updated to display a character set layout that corresponds to the set of characters from which the user would be most likely to want to select a character from next, based upon the frequency of that particular character combination being used in either a particular language or application. The organization of the characters within each character set layout is also based on the frequency of those characters being used in either a particular language or application. The keyboard can be implemented to operate as either a touch-sensitive display or as a collection of interactive images on any of a number of different displays. The keyboard can also be used in conjunction with the special function keys or buttons that are common to computer system for performing function-character command operations.

U.S. Pat. No. 5,387,042

Inventor: Carl W. Brown

Issued: Feb. 7, 1995

A multilingual keyboard system (10) including a customized keyboard unit (12) is provided to operate in conjunction with a central processing unit (14) and a logic system (16) having unique software in order to facilitate multilingual typing from a single keyboard. The keyboard (12) includes customized keys (20) which are shaped to receive label panels (70) on one of several selectable templates (18). Each template (18) corresponds to a particular character set which the user desires to utilize as an alternate character set to that appearing on the key labels (52) on the keyboard (12). The keyboard (12) also includes a keyboard mode toggle key (36) for toggling between a standard mode of operation and the selected alternate mode. The logic system (16) includes software having keymapping schemes associated with each selectable alternate mode. Changing templates (18) permits usage of multiple alternate modes with the same equipment.

U.S. Pat. No. 5,515,045

Inventor: Seung H. Tak

Issued: May 7, 1996

A multipurpose optical intelligent key board apparatus permitting a plurality of key tops made of transparent materials in an optical dot matrix arrangement to be moved upward and downward. It forces the corresponding positions of the optical dot matrix to be turned on or off, so that a computer or an electronic appliance can be operated by predetermined key inputs. Therefore, the function command words and characters appearing on the key tops are displayed by a display device supported by its software.

U.S. Pat. No. 6,199,125 B1

Inventor: Gino Cortesi

Issued: Mar. 6, 2001

An input manager operating on a computer system is disclosed. The computer system includes a processor, a display, an application running on the processor and being displayed on the display and a multi-key input device for inputting information to the application. The input manager manages the inputting of at least a portion of the information to the application, and runs on the processor in conjunction with the application and is displayed on the display in conjunction with the application as an input manager display. The input manager display has a command grid having a plurality of grid boxes, where each grid box represents an input choice at any one point in time and potentially several input choices over a period of time. Each grid box is mapped to a pre-determined key on the input device regardless of which input choice such grid box currently represents. Accordingly, activation of the pre-determined key selects the input choice currently represented by the grid box.

U.S. Pat. No. 2,313,343

Inventor: Stephen R. Light

Issued: Nov. 26, 1997

A keyboard having at least one keycap with a transparent front face is disclosed. The keyboard may be placed in front of a display so that an image displayed on the display may be visible through the keycap. The keycap may be slidably held by guide members which may be of any shaped configuration or a T shaped configuration.

SUMMARY OF THE PRESENT INVENTION

The present invention relates to computer keyboards, and more specifically, to a digital keyboard with a plurality of keys having a top key surface having means for displaying images and indicia thereon. While the images/indicia can be composed of any picture, illustration, words or combination thereof, the preferred embodiment of the present invention is to display predetermined images and/or words on key caps representing shortcut key sequences for performing functions related to a user's current in process computer software applications as opposed to using a mouse to perform those same function through activation and selection from drop down menus or icons. Alternatively, a digital display screen forming an integral part of a keyboard whereupon information related to software applications can be displayed.

Furthermore, an additional element provides for the capability to program every key on the keyboard (all standard keys). For example, to program the "Return Key" for the left side as opposed to its current right side location (a majority of computer users are right handed causing the user to lift their hand from the mouse to the keyboard for use thereof). The ability to change the location of one or more keys could increase workflow.

One embodiment of the present invention provides each key on the keyboard with a digital readout. With this the user is able to view all possible key variations in any font chosen. This is helpful when using shift and command key combinations. When using certain key combinations, the function of the key is different. For example, when depressing the "G" key the letter "G" appears on the screen. When the "Option G" key sequence is entered the "©" symbol appears on the screen. Every style font chosen may have a different end result for a particular key sequence. The software provides the capability of viewing the key combination in the "digital key cap" or the digital info display, which will save users from having to refer to charts or guessing at key sequences to obtain a desired result.

A primary object of the present invention is to provide a digital keyboard that overcomes the shortcomings of the prior art.

Another, secondary object of the present invention is to provide a digital keyboard that dynamically changes according to the current software application.

Another object of the present invention is to provide a digital keyboard having key caps that are able to display an image thereon.

Yet another object of the present invention is to provide a digital keyboard images displayed on the keycaps may be selectively varied.

Still yet another object of the present invention is to provide a digital keyboard having a display screen forming an integral part therewith.

A further object of the present invention is to provide a digital keyboard wherein the display screen can be selectively divided thereby forming a plurality of locations thereon.

A yet further object of the present invention is to provide a digital keyboard wherein each location on the display screen can be selectively assigned with a different function.

An additional object of the present invention is to provide a digital keyboard wherein the each of the plurality of locations on the display screen is able to selectively displaying an image, illustration, picture and/or words thereon signifying the function thereof.

Another object of the present invention is to provide a digital keyboard wherein the display screen including means for sensing a user selected location from said plurality of addressable locations.

Yet another object of the present invention is to provide a digital keyboard wherein the display screen locations are selectable and responsive to at least one of a human finger and stylus.

A further object of the present invention is to provide a digital keyboard wherein computer software selectively varies the key cap images and the plurality of display screen locations.

A yet further object of the present invention is to provide a digital keyboard wherein the computer software displays shortcut key sequences for the current application on the key caps or the plurality of display screen locations.

A still yet further object of the present invention is to provide a digital keyboard wherein the images on each of the key caps and display screen location displays can be changed in whole or in part by the computer software.

Another additional object of the present invention to provide a digital keyboard wherein the computer software program allows the user to change the images displayed on the key caps and display screen location displays through selection of a keyboard sequence.

Yet another object of the present invention is to provide a digital keyboard including a software program for obtaining a command code of a function in application software.

Still a further object of the present invention is to provide a digital keyboard wherein the software program assigns the command code of the function to one or more respective keys.

Yet a further object of the present invention is to provide a digital keyboard wherein upon opening up a second application software, the software program instantly obtains the functions associated with the second application software and assigns the shortcut key sequence to predetermined keyboard keys.

Another object of the present invention is to provide a digital keyboard for wherein the software program causes the key caps or display screen location displays to change thereby reflecting the second software application title and functions.

Still another object of the present invention is to provide a digital keyboard wherein the keyboard keys are selectively programmable by a user for accomplishing a desired function in an application.

Yet another object of the present invention is to provide a digital keyboard that is simple and easy to use.

Still yet another object of the present invention is to provide a digital keyboard device that is inexpensive to manufacture and operate.

Additional objects of the present invention will appear as the description proceeds.

The present invention overcomes the shortcomings of the prior art by providing a digital keyboard including a digital display positioned on the key cap for variably displaying a command shortcut that is associated with the key. The display field identifies the application associated with the function assigned to the key. The display fields are controlled by a software program which, upon opening an application detects the command shortcuts associated with a plurality of keys and assigns each function to one or more keys. Additionally, as new applications are opened the software instantaneously updates the key cap display field to reflect the new application and functions thereof.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
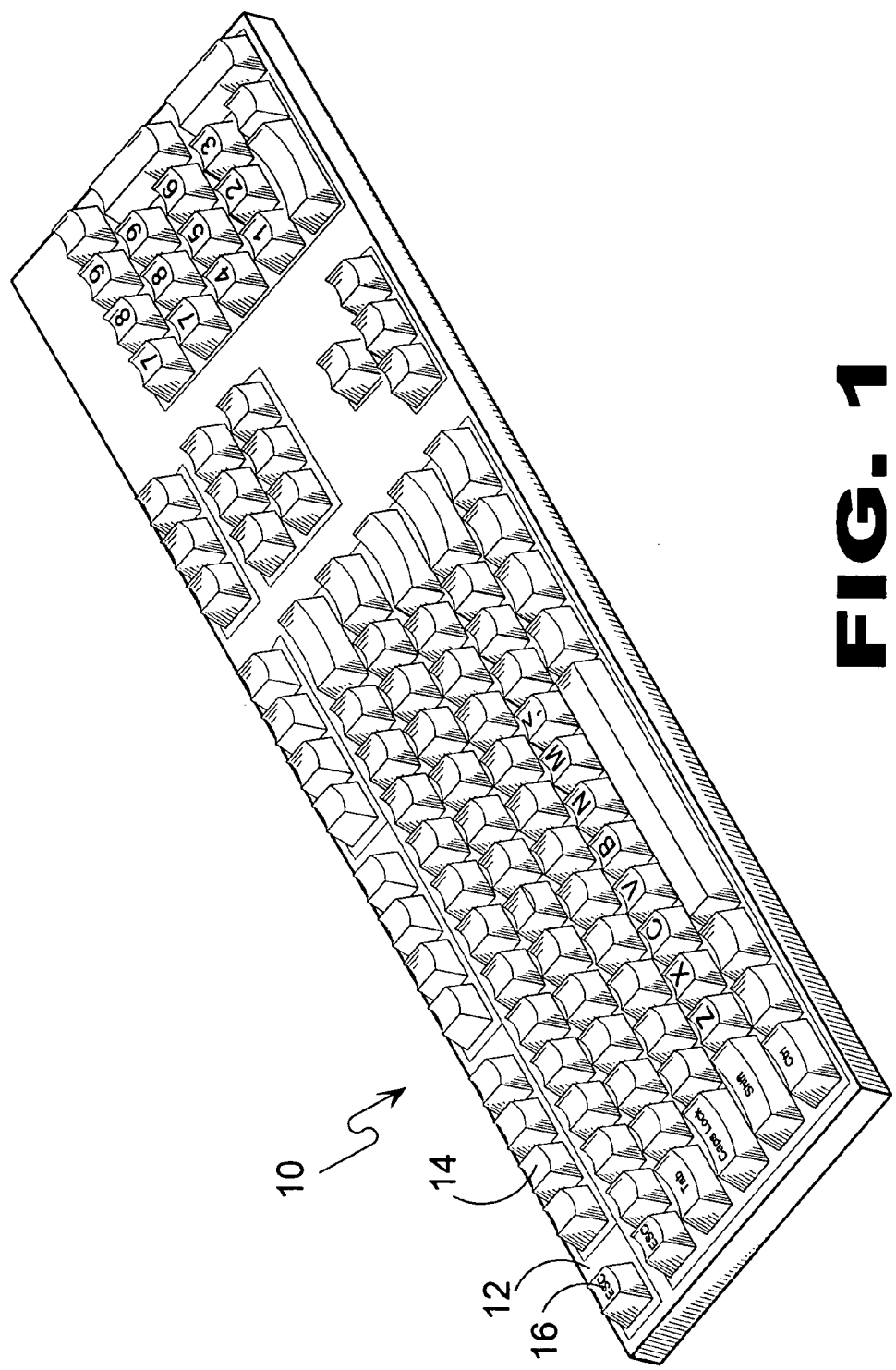
FIG. 1 is a perspective view of the digital keyboard of the present invention having digital display key-caps.

Turning now descriptively to the drawings, in which similar reference characters denote similar elements throughout the several views, the Figures illustrate the digital keyboard of the present invention. With regard to the reference numerals used, the following numbering is used throughout the various drawing Figures.

10 digital keyboard of the present invention
12 digital keyboard key
13 top side
14 digital keyboard key-cap
15 screen
16 digital keyboard key-cap image
18 digital keyboard display screen
20 application display screen
22 digital key field
24 individual key field
26 key specific information display
28 display screen application menu bar display
32 display screen contour

DETAILED DESCRIPTION OF THE PREFERRED EMBODIMENT

The following discussion describes in detail one embodiment of the invention. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 14 illustrate a digital display keyboard of the present invention indicated generally by the numeral 10.

FIG. 1 is a perspective view of the digital keyboard 10 of the present invention. The digital keyboard 10 includes a plurality of keycaps 14 positioned thereon. Each respective keycap 14 corresponds to at least one of an alpha-numeric character and a function. Keyboards are commonly known in the prior art and are selectively connected to a computer for allowing a user to at least one of inputting information and performing a function in a software program running on the computer. However, at least one of the keycaps 14 of the digital keyboard 10 of the present invention is able to display a keycap image 16 thereon. Preferably, the keycap 14 includes a top side 13 having an LCD screen 15 positioned thereon. However, the keycap 14 may be formed in any way that allows an image to be displayed on the top side 13 thereof. The LCD screen 15 is able to selectively be illuminated to display the keycap image 16 thereon. When a user depresses a respective keycap 14 having an image 16 illuminated thereon, a function correlated to the image 16 is performed in the software application currently running on the computer. This is advantageous in that the digital keyboard 10 of the present invention allows a user to perform a function by depressing a single key instead of multiple keystrokes or using an additional input device such as a mouse. It is also preferable that a plurality of the keycaps 14 positioned on the keyboard 12 are able to selectively display images 16 thereon. Having a keyboard 12 with a plurality of keycaps 14 able to display images thereon would allow a user to save time by being able to complete a plurality of tasks using only a single keystroke.

Figure 2:
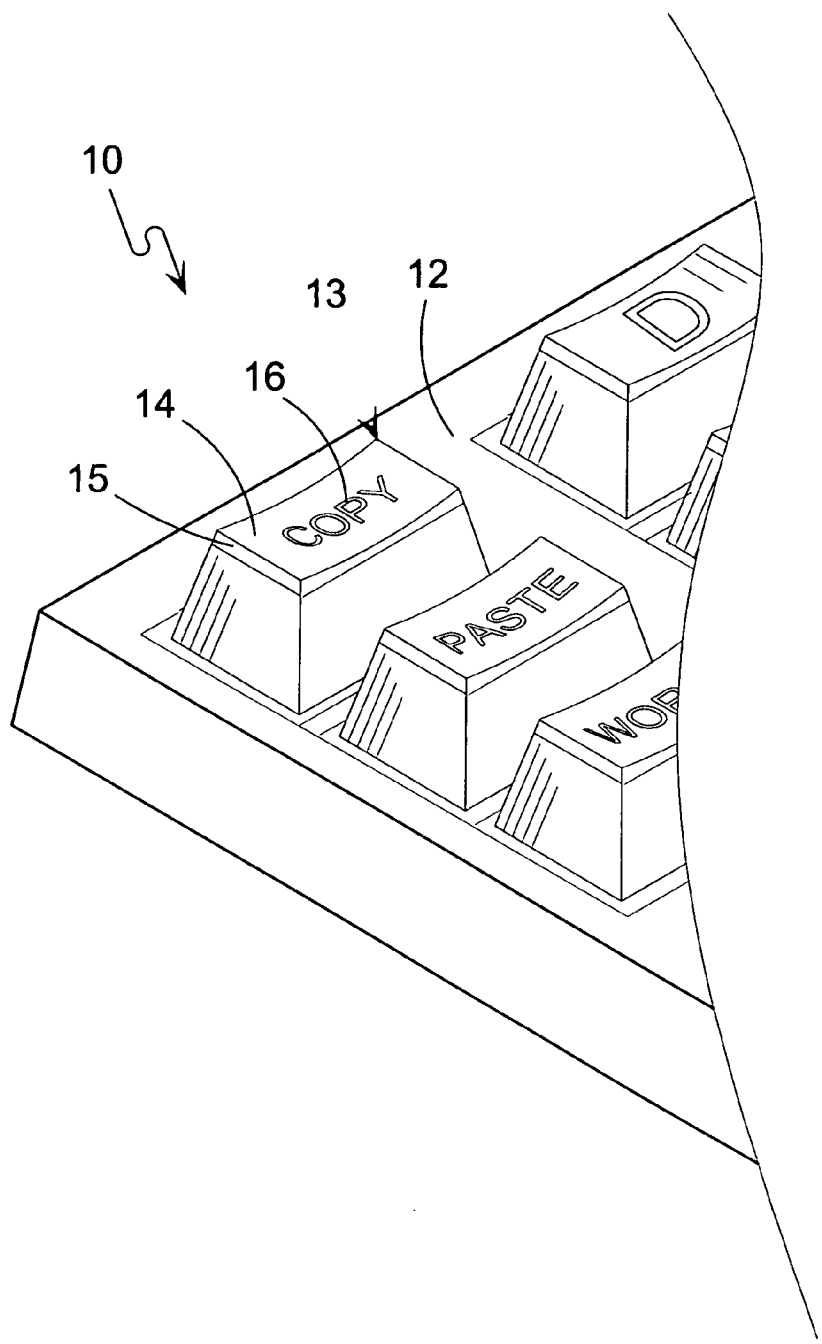
FIG. 2 is an enlarged partial view of the keys of the digital keyboard having a digital display on the top surface.

FIG. 2 is an enlarged partial view of the keys of the digital keyboard having a digital display on the top surface. At least one of the keycaps 14 of the digital keyboard 10 of the present invention is able to display a keycap image 16 thereon. Preferably, the keycap 14 includes a top side 13 having an LCD screen 15 positioned thereon. However, the keycap 14 may be formed in any way that allows an image to be displayed on the top side 13 thereof. The LCD screen 15 is able to selectively be illuminated to display they keycap image 16 thereon. When a user depresses a respective keycap 14 having an image 16 illuminated thereon, a function correlated to the image 16 is performed in the software program currently running on the computer. This is advantageous in that the digital keyboard 10 of the present invention allows a user to perform a function by depressing a single key instead of multiple keystrokes or using an additional input device such as a mouse. It is also preferable that a plurality of the keycaps 14 positioned on the keyboard 12 are able to selectively display images 16 thereon. Having the keyboard 12 with a plurality of keycaps 14 able to display images thereon would allow a user to save time by being able to complete a plurality of tasks using only a single keystroke. As shown in FIG. 2, functions including copy and paste are associated with two respective keycaps 14. However, these functions are described for purposes of example only and any function able to be performed by any software application may be assigned to a respective keycap 14.

Figure 3:
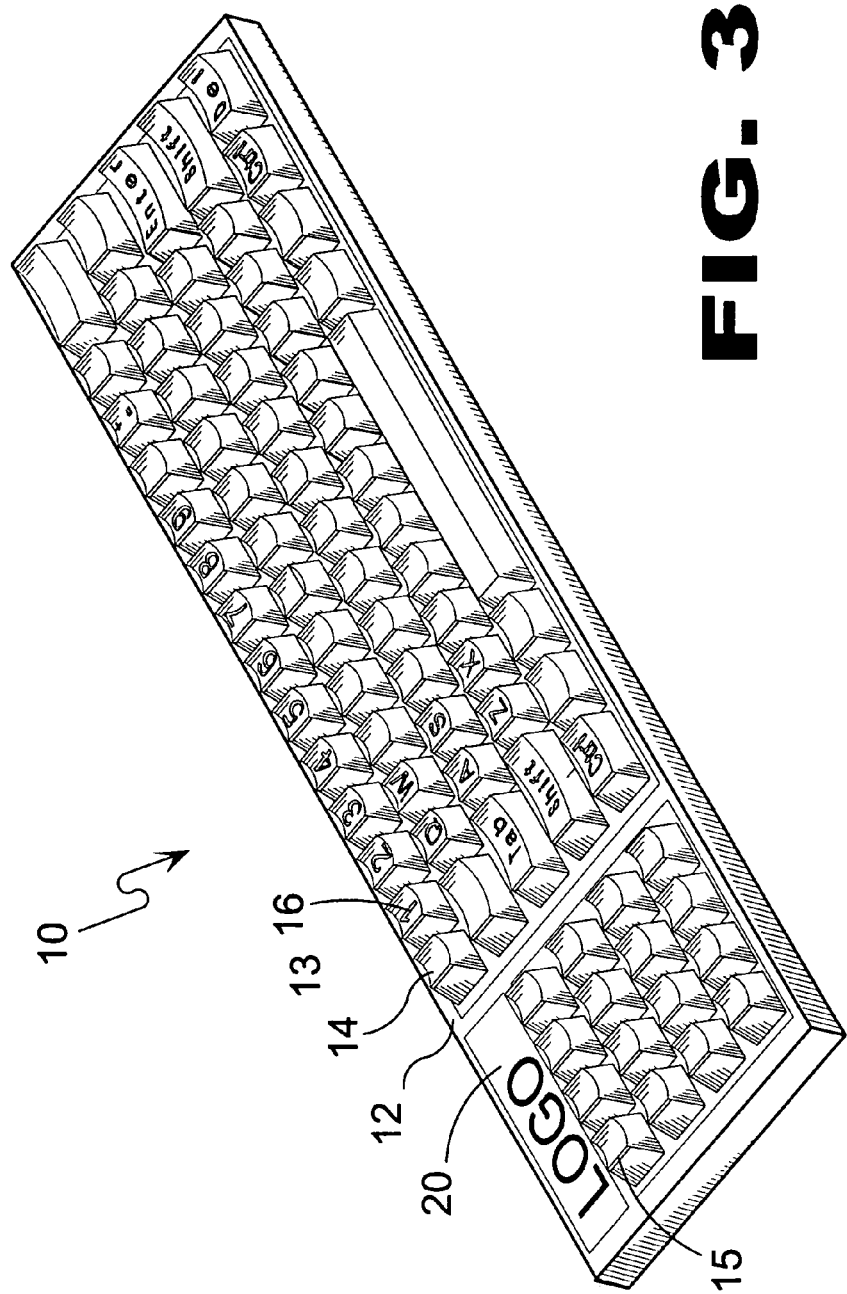
FIG. 3 is a perspective view of the keyboard of the present invention having application keys functioning as typical function keys and numeric keypad.

FIG. 3 is a perspective view of the keyboard of the present invention having application keys functioning as typical function keys and numeric keypad. At least one of the keycaps 14 of the digital keyboard 10 of the present invention is able to display a keycap image 16 thereon. Preferably, the keycap 14 includes a top side 13 having an LCD screen 15 positioned thereon. However, the keycap 14 may be formed in any way that allows an image to be displayed on the top side 13 thereof. The LCD screen 15 is able to selectively be illuminated to display they keycap image 16 thereon. When a user depresses a respective keycap 14 having an image 16 illuminated thereon, a function correlated to the image 16 is performed in the software program currently running on the computer. This is advantageous in that the digital keyboard 10 of the present invention allows a user to perform a function by depressing a single key instead of multiple keystrokes or using an additional input device such as a mouse. It is also preferable that a plurality of the keycaps 14 positioned on the keyboard 12 are able to selectively display images 16 thereon.

Figure 4:
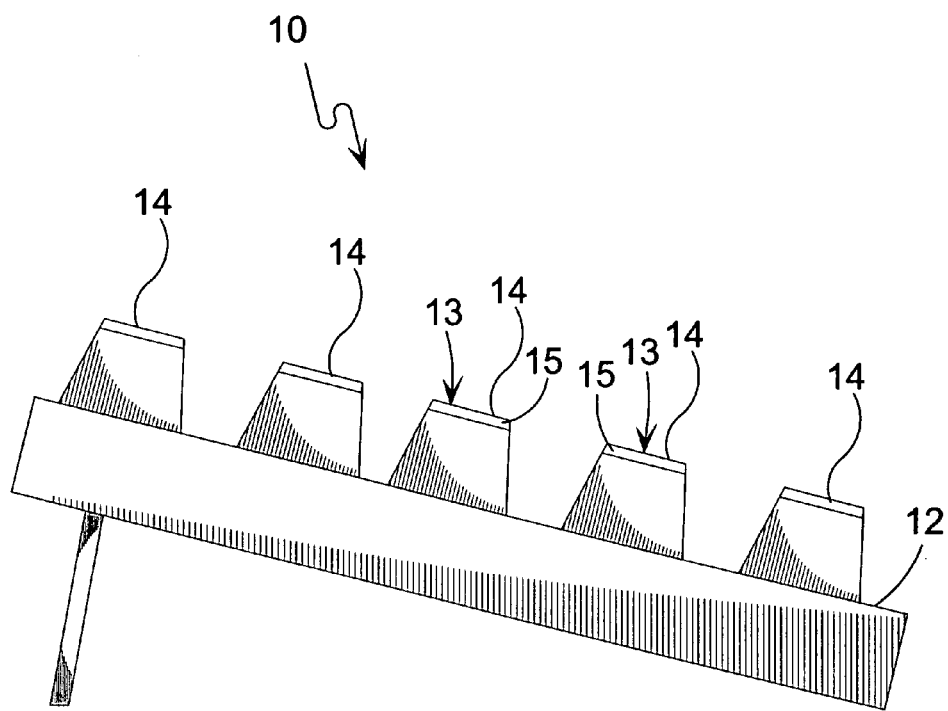
FIG. 4 is a side view of the digital keyboard of the present invention showing the keys having a digital display forming an integral part therewith.

FIG. 4 is a side view of the digital keyboard of the present invention showing the keys having a digital display forming an integral part therewith. At least one of the keycaps 14 of the digital keyboard 10 of the present invention is able to display a keycap image 16 thereon. Preferably, the keycap 14 includes a top side 13 having an LCD screen 15 positioned thereon. However, the keycap 14 may be formed in any way that allows an image to be displayed on the top side 13 thereof. The LCD screen 15 is able to selectively be illuminated to display they keycap image 16 thereon. When a user depresses a respective keycap 14 having an image 16 illuminated thereon, a function correlated to the image 16 is performed in the software program currently running on the computer. This is advantageous in that the digital keyboard 10 of the present invention allows a user to perform a function by depressing a single key instead of multiple keystrokes or using an additional input device such as a mouse. It is also preferable that a plurality of the keycaps 14 positioned on the keyboard 12 are able to selectively display images 16 thereon. Having the keyboard 12 with a plurality of keycaps 14 able to display images thereon would allow a user to save time by being able to complete a plurality of tasks using only a single keystroke.

Figure 5:
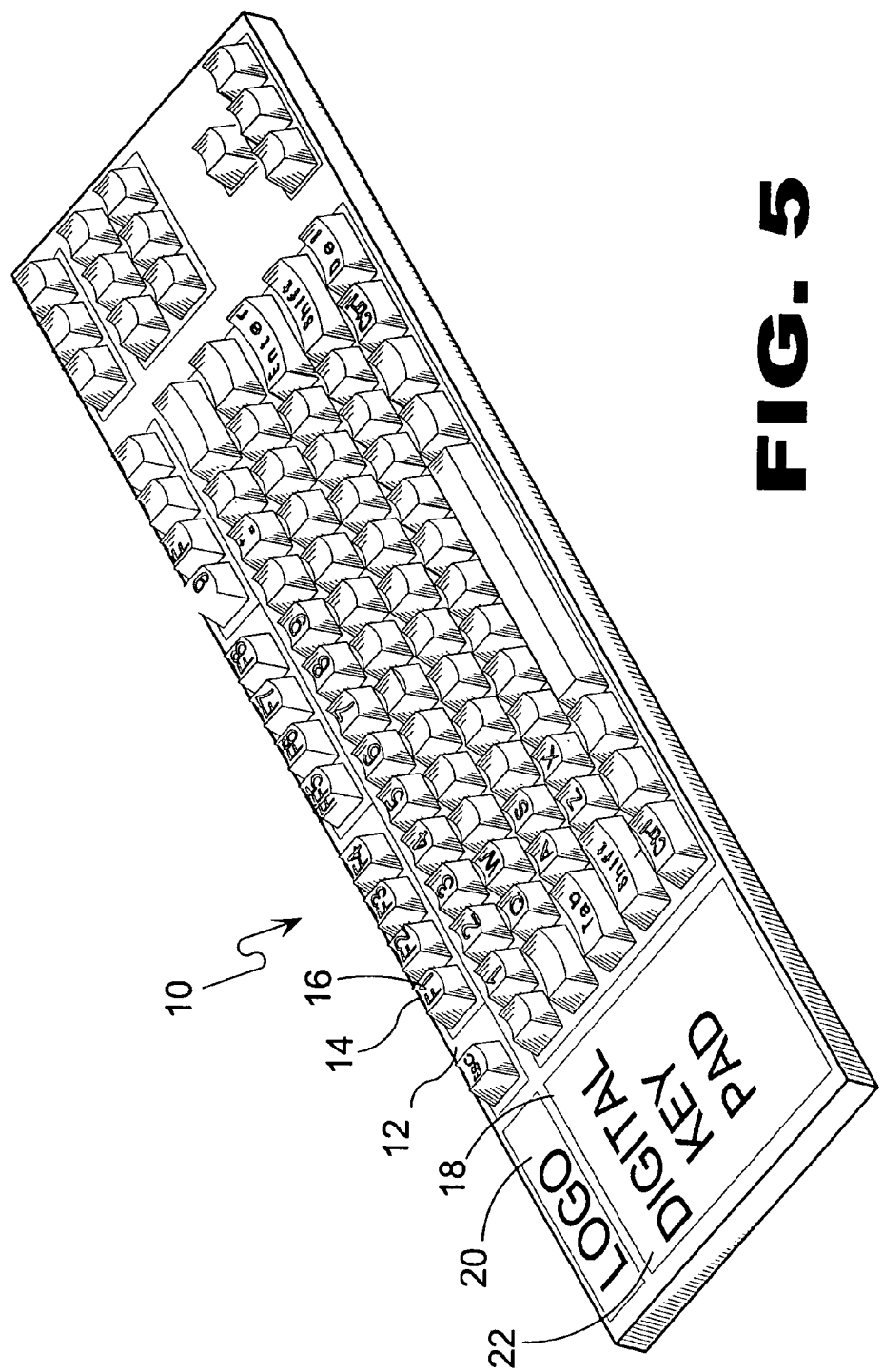
FIG. 5 is a perspective view of the keyboard of the present invention having a display screen forming an integral part therewith.

FIG. 5 is a perspective view of the keyboard of the present invention having a display screen forming an integral part therewith. At least one of the keycaps 14 of the digital keyboard 10 of the present invention is able to display a keycap image 16 thereon. Preferably, the keycap 14 includes a top side 13 having an LCD screen 15 positioned thereon. However, the keycap 14 may be formed in any way that allows an image to be displayed on the top side 13 thereof. The LCD screen 15 is able to selectively be illuminated to display they keycap image 16 thereon. When a user depresses a respective keycap 14 having an image 16 illuminated thereon, a function correlated to the image 16 is performed in the software program currently running on the computer. This is advantageous in that the digital keyboard 10 of the present invention allows a user to perform a function by depressing a single key instead of multiple keystrokes or using an additional input device such as a mouse. It is also preferable that a plurality of the keycaps 14 positioned on the keyboard 12 are able to selectively display images 16 thereon. Having the keyboard 12 with a plurality of keycaps 14 able to display images thereon would allow a user to save time by being able to complete a plurality of tasks using only a single keystroke.

Figure 6:
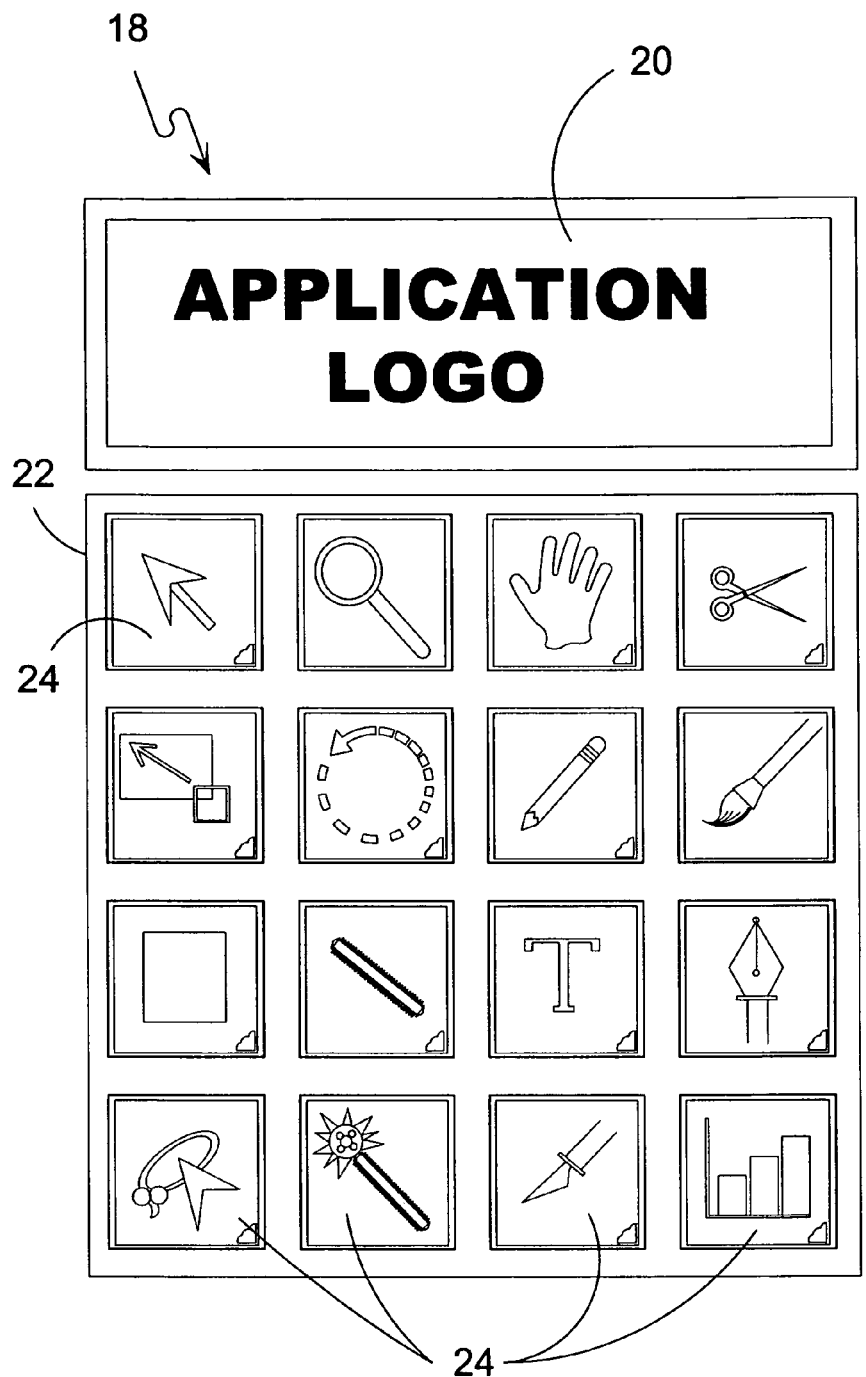
FIG. 6 is an illustrative view of the keyboard digital display screen having an application display area and application key field.

This embodiment also includes an application display screen 20 formed as an integral part of the keyboard 12 of the present invention. A digital key field 22 is positioned immediately below the application display screen 20. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24 as is shown in FIG. 6. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

It is also preferable that both the application display 20 and the digital key field 22 selectively change as the user cycles through different programs which are being run by the computer. Therefore, as the user switches software applications that are active, the title in the application display 20 changes as well as the individual fields 24 of the digital key field 22. This changeover can occur automatically or in response to a users direction. Furthermore, the user can selectively determine the function which can be performed by any or all of the individual fields 24 of the digital key field 22. This allows the user flexibility so that he is able to maximize his/her efficiency while using the computer.

FIG. 6 is an illustrative view of the keyboard digital display screen having an application display area and application key field. FIG. 6 shows the application display screen 20 formed as an integral part of the keyboard 12 of the present invention. The digital key field is positioned immediately below the application display screen 20. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

FIG. 6 shows the digital key field 22 being divided into a plurality of evenly sized display fields 24 each having a unique function associated therewith. However, the digital key field 22 can be divided into any number of individual fields 24 whereby each individual field is of a different size.

Figure 7:
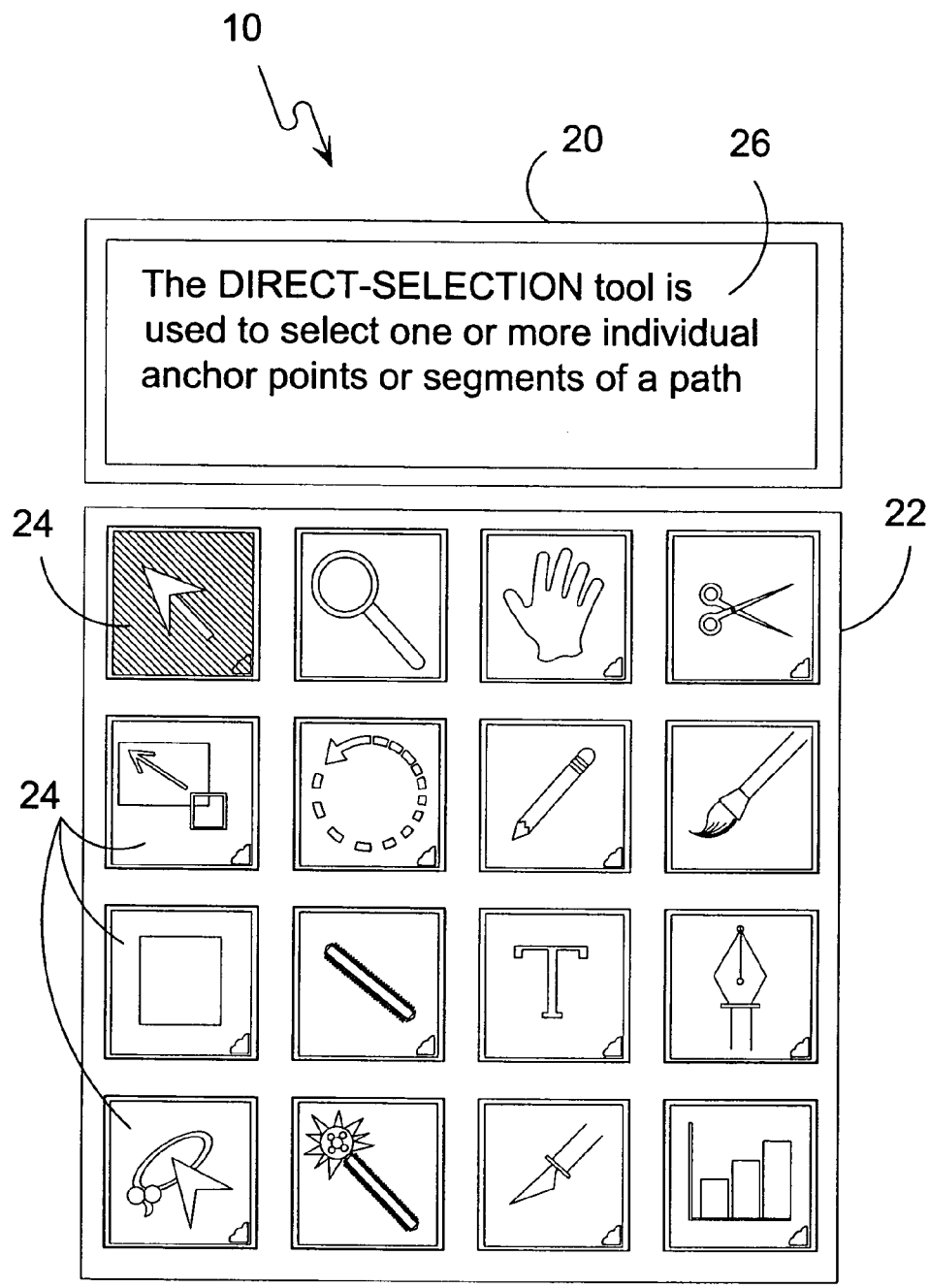
FIG. 7 is an illustrative view of the keyboard digital display screen in use wherein the application display area display key function information.

FIG. 7 is an illustrative view of the keyboard digital display screen in use wherein the application display area display key function information. FIG. 7 shows the application display screen 20 formed as an integral part of the keyboard 12 of the present invention. The digital key field 22 is positioned immediately below the application display screen 20. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

Upon a user selecting an individual field 24, the application display field 20 selectively displays a description of the action being performed by touching or depressing the individual field 24. As the user selects a different individual function associated with a different individual field 24, the text in the application display field 20 changes as well. If the user de-selects the individual display field 24 or has not selected the field 24, then the application display 20 merely displays the logo which represents the title of the software application which is active on the user's computer.

Figure 8:
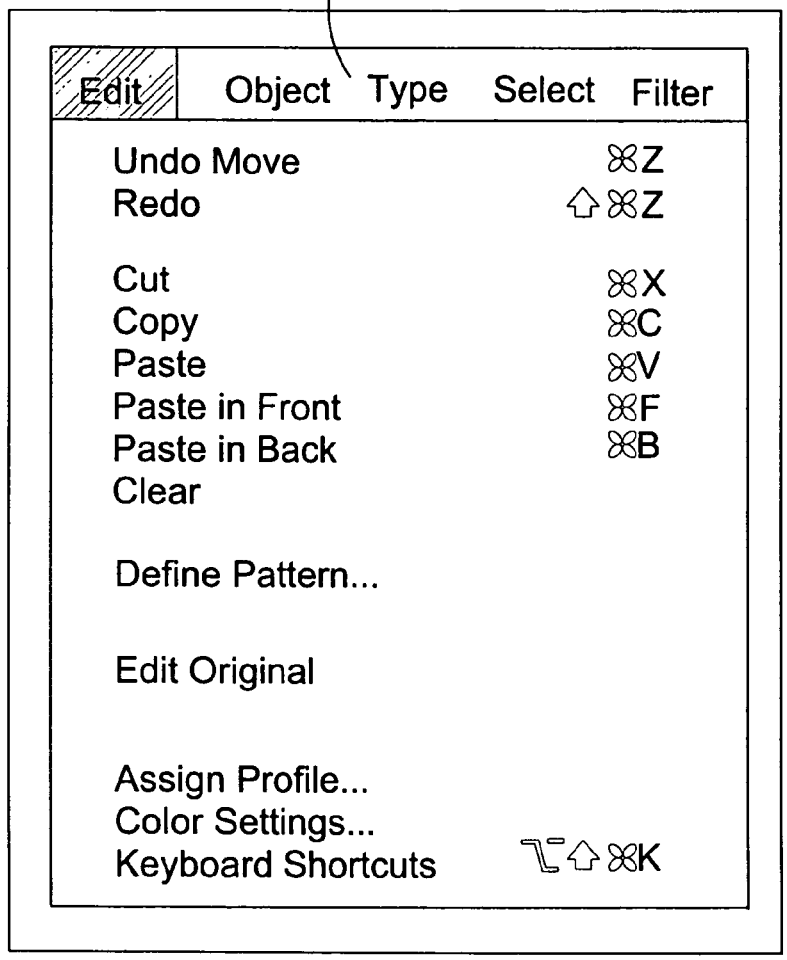
FIG. 8 is an illustration display of a typical application pull down menu having shortcut keys displayed therein, which would now be displayed on the digital key caps.

FIG. 8 is an illustration display of a typical application pull down menu having shortcut keys displayed therein, which would now be displayed on the digital key caps. The digital key field 22 is positioned immediately below the application display screen 20 as shown in FIGS. 6 and 7. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

A digital display screen 18 is able to selectively display text and images associated with a drop-down menu 28 of the active software application. A user can then selectively determine which shortcuts will be applied to either the keycap 14 or the individual display field 24 of the digital key field 22. The user can cycle through each of the drop down menus and assign shortcuts to each of the keycaps 14 and the individual fields 24 of the digital key field 22.

Figure 9:
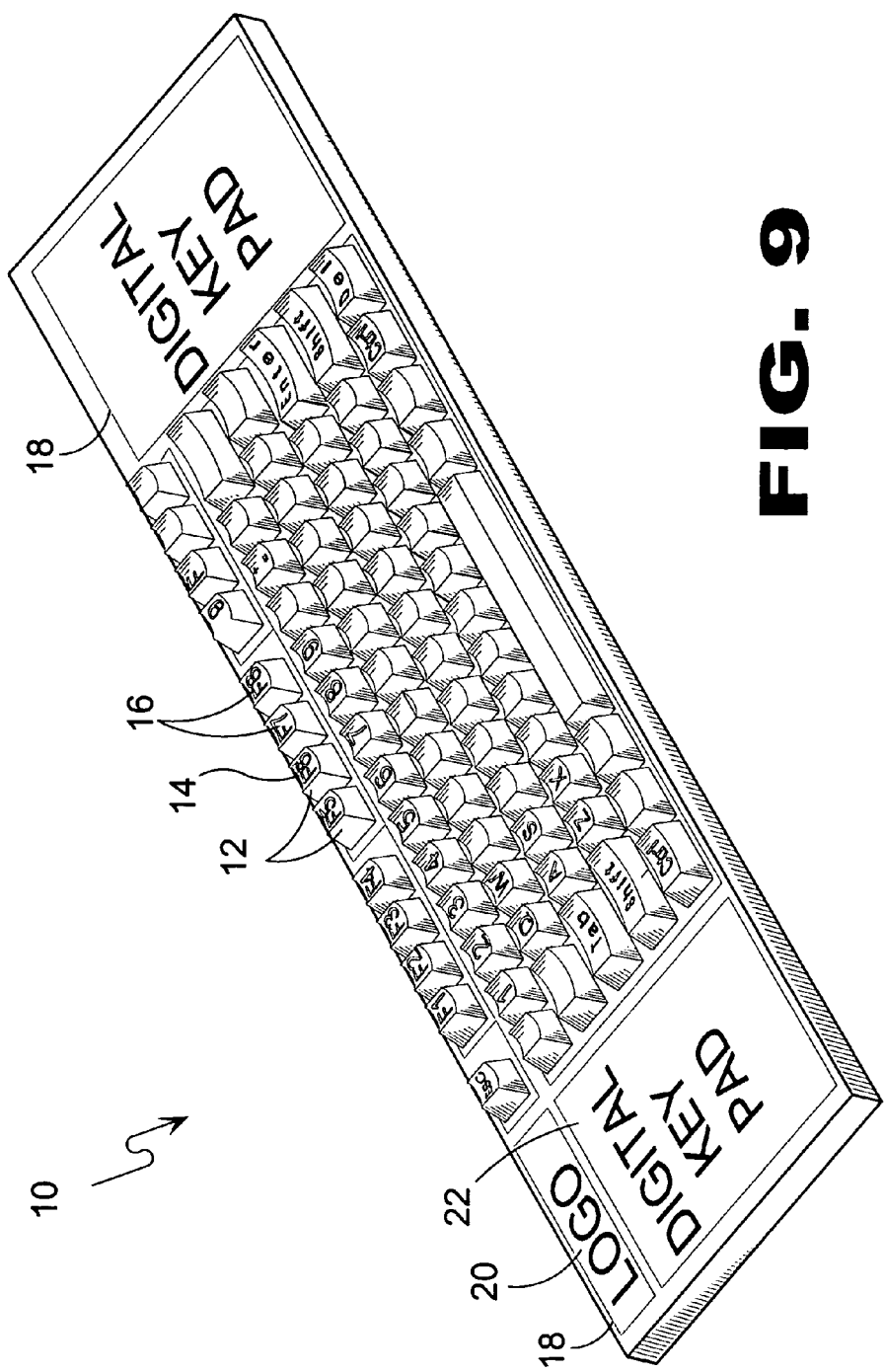
FIG. 9 is a perspective view of the keyboard of the present invention having digital display screens positioned on each side of the keyboard.

FIG. 9 is a perspective view of the keyboard of the present invention having digital display screens positioned on each side of the keyboard. At least one of the keycaps 14 of the digital keyboard 10 of the present invention is able to display a keycap image 16 thereon. Preferably, the keycap 14 includes a top side 13 having an LCD screen 15 positioned thereon. However, the keycap 14 may be formed in any way that allows an image to be displayed on the top side 13 thereof. The LCD screen 15 is able to selectively be illuminated to display they keycap image 16 thereon. When a user depresses a respective keycap 14 having an image 16 illuminated thereon, a function correlated to the image 16 is performed in the software program currently running on the computer. This is advantageous in that the digital keyboard 10 of the present invention allows a user to perform a function by depressing a single key instead of multiple keystrokes or using an additional input device such as a mouse. It is also preferable that a plurality of the keycaps 14 positioned on the keyboard 12 are able to selectively display images 16 thereon. Having the keyboard 12 with a plurality of keycaps 14 able to display images thereon would allow a user to save time by being able to complete a plurality of tasks using only a single keystroke.

FIG. 9 shows the application display screen 20 formed as an integral part of the keyboard 12 of the present invention. The digital key field is positioned immediately below the application display screen 20. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

As shown in FIG. 9, the keyboard 12 includes two display screens 18 and a digital key field 22. One of the display screens 18 is an application display screen 20 and the second is a digital sensory pad, which is used for cursor control.

Figure 10:
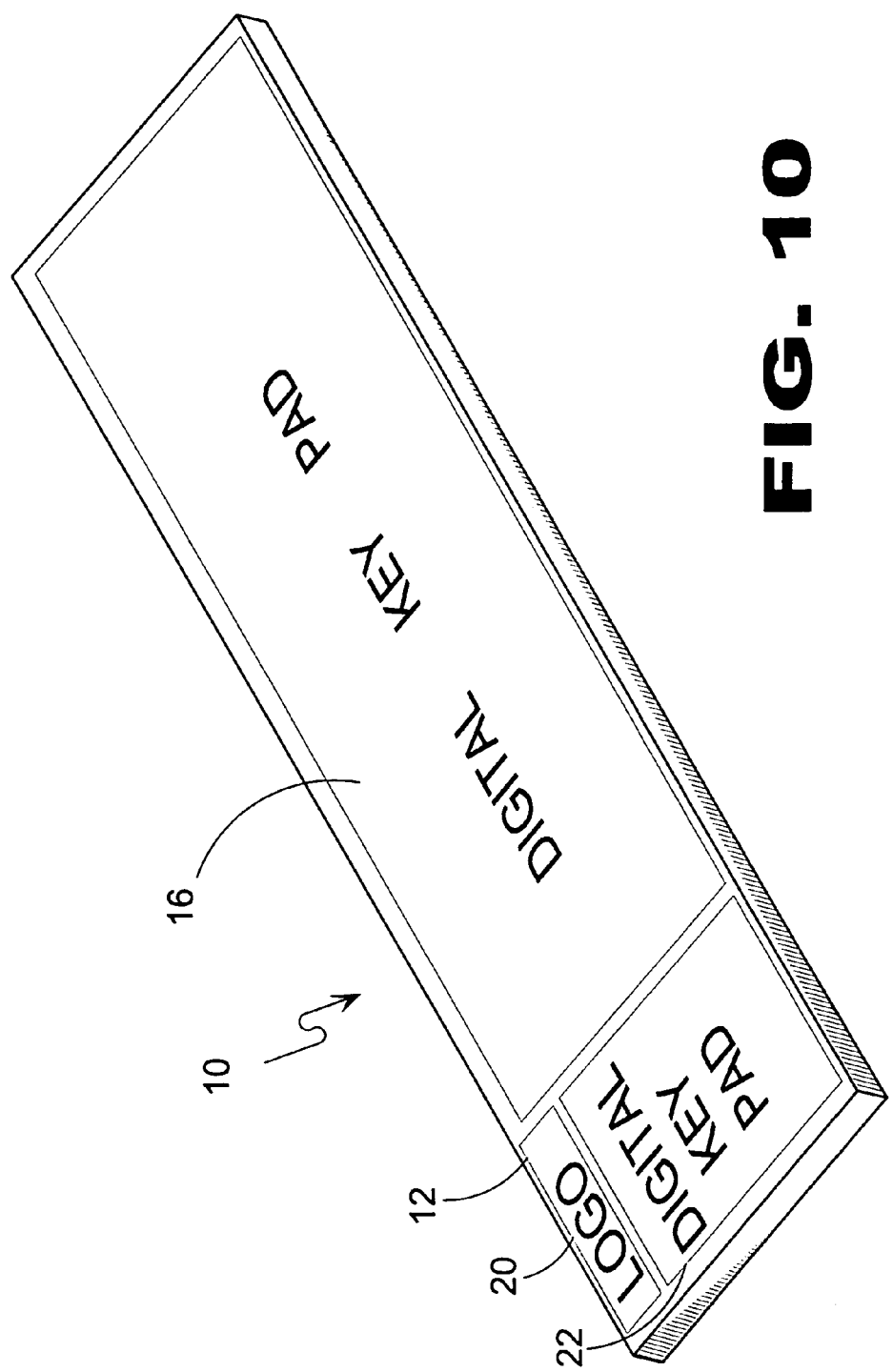
FIG. 10 is a perspective view of the keyboard of the present invention comprised entirely of a digital display screen.

FIG. 10 is a perspective view of the keyboard of the present invention comprised entirely of a digital display screen. FIG. 10 shows the application display screen 20 formed as an integral part of the keyboard 12 of the present invention. The digital key field is positioned immediately below the application display screen 20. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

The digital keyboard 10 of the present invention as shown in FIG. 9 includes two digital key fields 22. A main digital key field 22 is shaped as a conventional keyboard and may be selectively divided so that each individual field 24 represents a key on a conventional keyboard. Alternatively, the individual fields 24 of the main digital key field may change as either directed by the software application running on the computer or by the user. The second digital key field 22 is positioned adjacent to the main field 22 and function similarly to the digital key field described in FIGS. 6-8.

Figure 11:
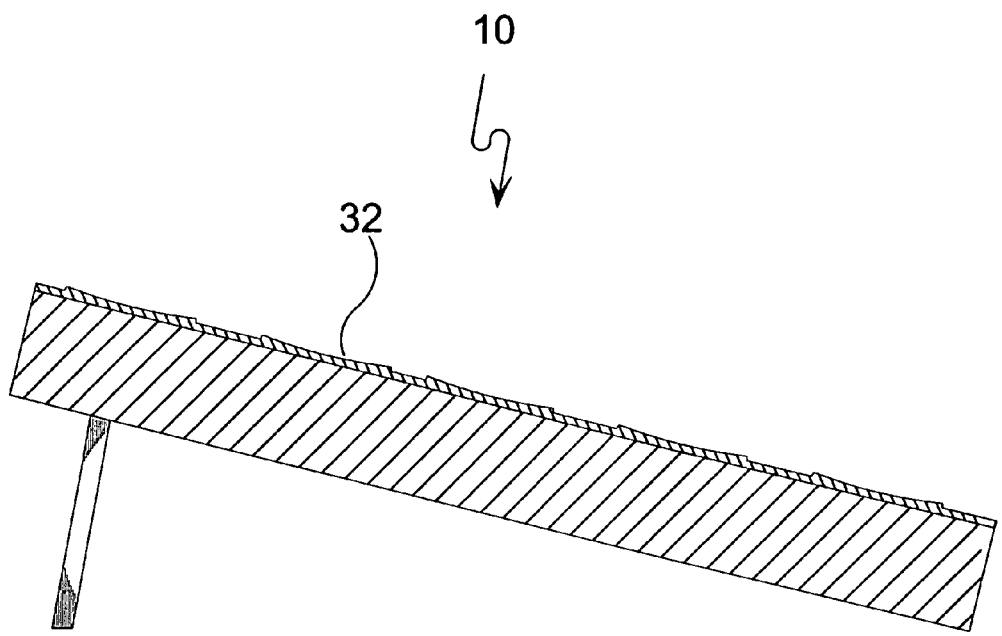
FIG. 11 is a side sectional view of the keyboard of the present invention wherein the digital display screen incorporated a contoured top surface.

FIG. 11 is a side sectional view of the keyboard of the present invention wherein the digital display screen incorporated a contoured top surface. The application display screen 20 formed as an integral part of the keyboard 12 of the present invention. The digital key field is positioned immediately below the application display screen 20. The application display screen 20 is preferably an LCD display that is able to selectively display a title of software application that is currently running on the computer. The digital key field 22 function similarly to the keycaps 14 whereby a specific function able to be performed by the software running on the computer may be assigned thereto. The digital key field 22 is selectively dividable into a plurality of individual fields 24. Each individual field 24 can represent a different function that a user is able to perform in the running software application. Also, at least one of an image and text may be displayed in each individual field 24 to signify what function is performed when the field 24 is selected. Preferably, the digital key field 22 is touch sensitive thereby allowing a user to place a finger or thumb thereon which would cause the function associated with the individual field to be performed. However, the digital key field 22 may also be responsive to any device such as a stylus and perform the associated function when contacted by the device.

The digital keyboard 10 of the present invention as shown in FIG. 10 includes two digital key fields 22. A main digital key field 22 is shaped as a conventional keyboard and may be selectively divided so that each individual field 24 represents a key on a conventional keyboard. Alternatively, the individual fields 24 of the main digital key field may change as either directed by the software application running on the computer or by the user. The second digital key field 22 is positioned adjacent to the main field 22 and function similarly to the digital key field described in FIGS. 6-8.

FIG. 11 shows the side view of the digital display keyboard 10 of the present invention as described in FIG. 10. Since the keyboard 12 is formed entirely of digital key fields 22 and digital display screens 18, the contour 32 of the keyboard is substantially flat.

Figure 12:
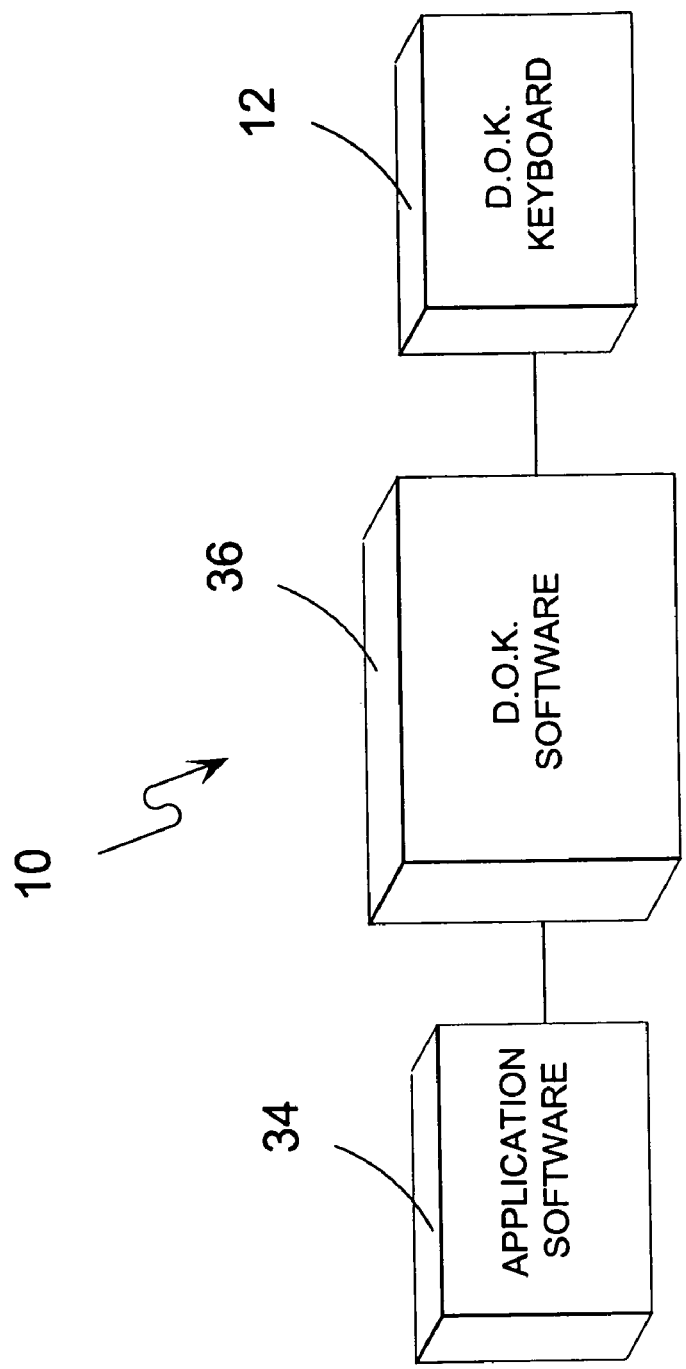
FIG. 12 is a block diagram of the software program of the digital keyboard of the present invention.

FIG. 12 is a block diagram of the software program of the digital keyboard of the present invention. The digital keyboard 10 of the present invention is controlled by software 36. The digital keyboard software 36 interfaces with computer application software 34. The digital keyboard software 36 is able to automatically detect at least one of a plurality of functions, tools, and shortcuts associated with the computer application software 34. The digital keyboard software 36 then allows the at least one of functions, tools, and shortcuts to be applied to at least one of keycap 14 and an individual display field 24 of the digital key field 22. Upon depressing the at least one of keycaps 14 and individual display fields 24, the digital keyboard software 36 signals to the computer software application to perform the function associated with the either the keycap 14 or the individual display field 34.

Also, the digital keyboard software 36 allows the user to selectively assign at least one of a function, tool, and shortcut to either a keycap or an individual display field 24 of the digital key field 32. This allows the user to customize the shortcuts and use the computer more efficiently.

The digital keyboard software 36 is able to connect to a plurality of computer software applications 34. When the digital keyboard software 36 is connected to a plurality of computer software applications 34, the digital keyboard software causes a title of the active software application to be displayed on the application display screen 20 and the shortcuts to be displayed on at least one of the keycaps 14 and the digital key field 22. Should the user actively change software applications, the digital keyboard software 36 changes the display on the at least one of keycaps and digital key fields to reflect the new active software application.

Figure 13:
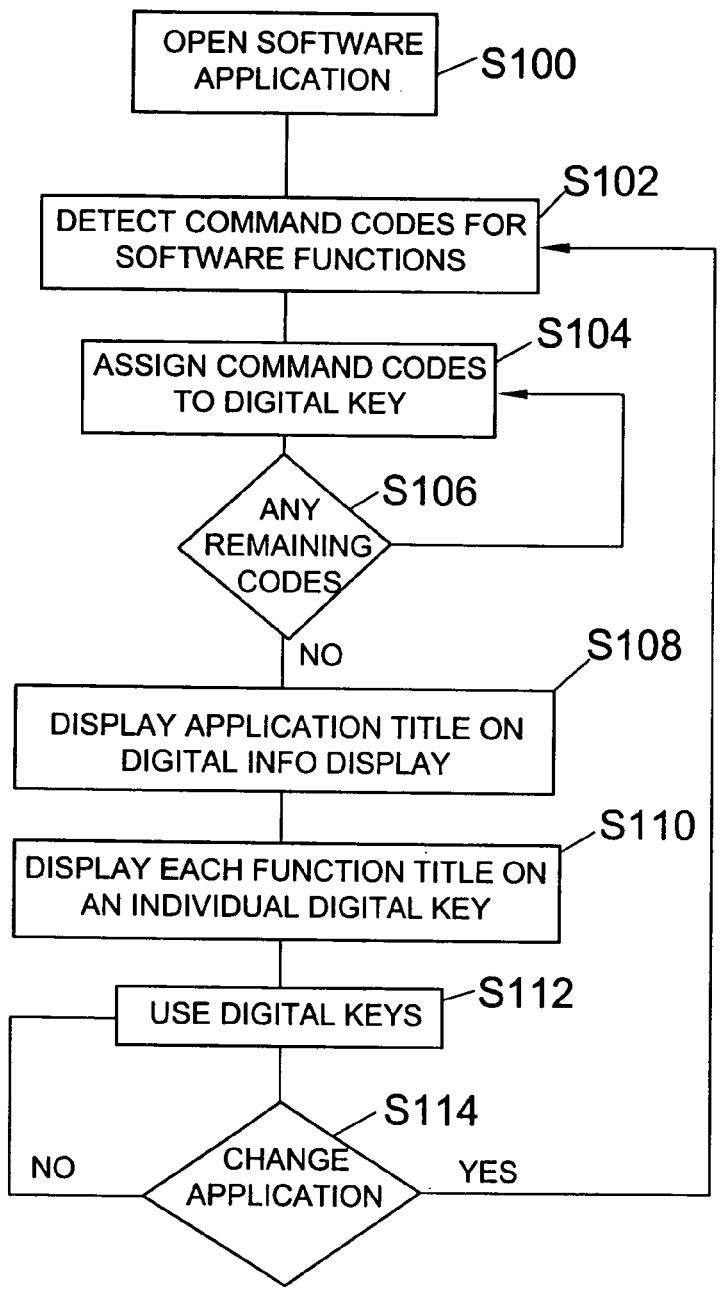
FIG. 13 is a flowchart detailing the function assignment process of the software program of the digital keyboard of the present invention.

FIG. 13 is a flowchart detailing the function assignment process of the software program of the digital keyboard of the present invention. As shown in step S100, a software application is opened on a computer. The digital keyboard software 36 detects the command codes for the software functions in step S102. The software function is then assigned to at least one of a keycap 14 and a digital key field 24 as stated in step S104. The software then determines if there are any remaining unassigned codes in step S106. If yes, then step S104 is repeated and any unassigned command code is assigned to at least one of a keycap and digital key. If the software determines that there are no unassigned codes, then step S108 calls for the software to display the title of the application on the digital display 20. Thereafter, each function assigned to a digital key or keycap is displayed thereon as in step S110 so that the functions may be performed as in step S112. The software then determines in step S114 if the application has changed. If it has not, then the digital keys are able to be used as in step S112. If, however, the software determines that the application has changed, the software causes the steps S102-S114 to be repeated.

Figure 14:
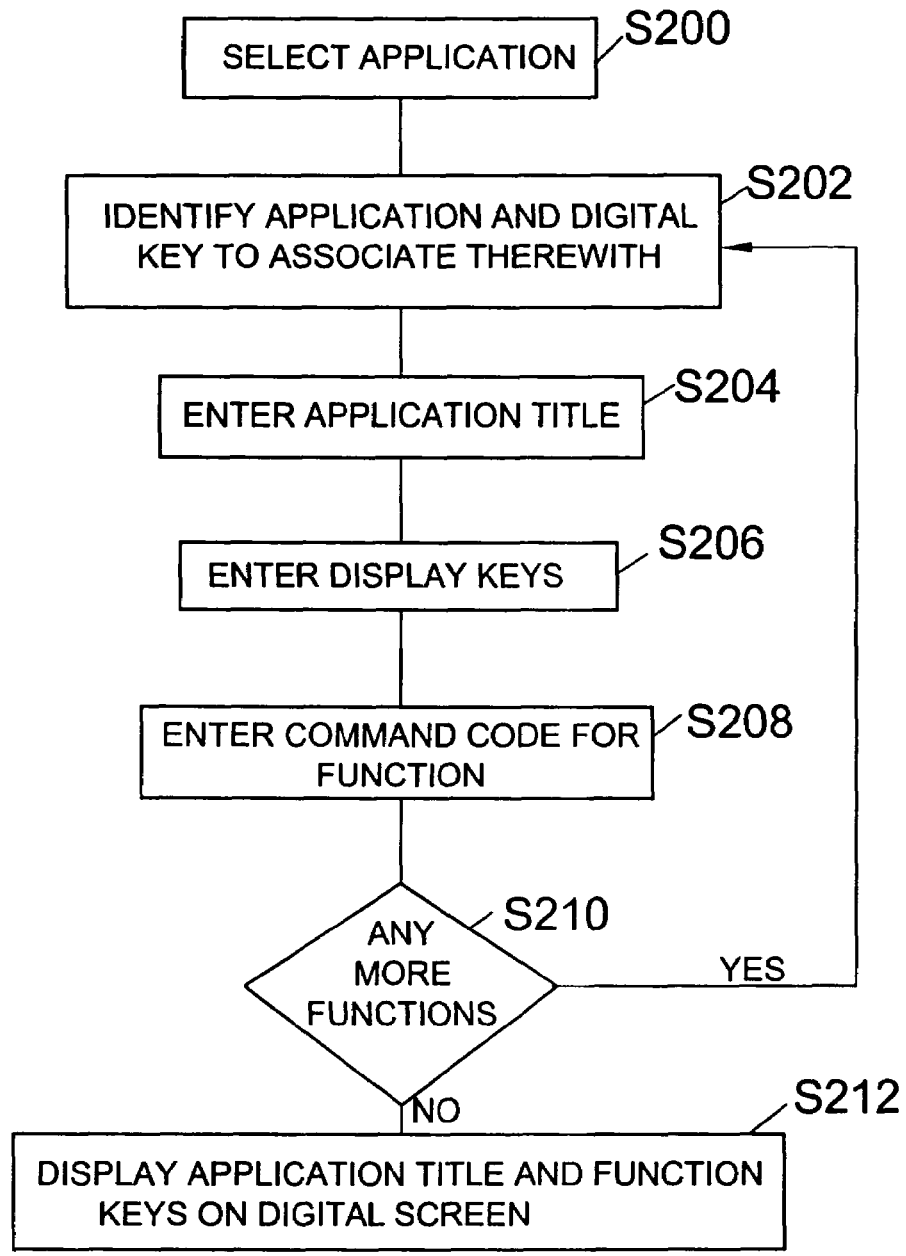
FIG. 14 is a flowchart detailing the programming process of the software program of the digital keyboard of the present invention.

FIG. 14 is a flowchart detailing the programming process of the software program of the digital keyboard of the present invention. As shown in step S200, the user selects an application for use on the computer. The user then identifies the function and a digital key to associate the function therewith as in step S202. The user then inputs the title of the application 204 and then enters the title to be displayed on the digital key in step S206. Thereafter, the command representing the function to be assigned is entered in step S208. The software then determines if there are any more functions to be assigned by the user in step S210. If the user desires to assign more functions, then the software repeats steps S202-S210. If there are no more functions to be assigned then the title of the application and function are displayed in step S212 on the digital screen ready for use by the user.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A digital keyboard comprising:
   a) a plurality of individual keycaps corresponding to alpha-numeric characters and a variety of functions associated with a keyboard;
   b) a digital display on an upper surface of each of selected keycaps indicating a function to be carried out by pressing a selected keycap;
   c) means for acquiring a command code representing the function from a computer software application, and assigning said acquired command code to each said selected keycap;
   d) each said function representing a plurality of tasks using only a single keystroke;
   e) a first touch sensitive screen on said keyboard adjacent said keycaps containing a first digital key field, said first digital key field divided into individual fields containing icons representing specific functions in an application program being run from said keyboard;
   f) said first digital key field selectively changing as a user cycles through different programs which are being run, said first digital key field having a title area which displays the program being run and which changes as the program changes; and
   g) said keyboard having a second touch sensitive screen containing a second digital key field, said second digital key field having a pull down menu for selecting a keyboard shortcut, specific functions for display on and execution by said selected keycaps and individual fields in said first digital key field.

2. The digital keyboard as recited in claim 1, wherein said display is an LCD screen.

3. The digital keyboard as recited in claim 1, wherein said acquiring and assigning means is a computer program.

4. The digital keyboard as recited in claim 1, wherein said means for acquiring and assigning is able to acquire and assign a plurality of functions associated with a plurality of computer software applications.

\* \* \* \* \*